US011402933B2

(12) United States Patent
Van Neer et al.

(10) Patent No.: US 11,402,933 B2
(45) Date of Patent: Aug. 2, 2022

(54) DEVICE WITH A TOUCH USER INTERFACE FOR CONTROLLING A LOAD, A SYSTEM AND A METHOD THEREOF

(71) Applicant: SIGNIFY HOLDING B.V., Eindhoven (NL)

(72) Inventors: Alexander Jacobus Mariette Van Neer, Eindhoven (NL); Franciscus Jacobus Vossen, Eindhoven (NL); Tim Dekker, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 187 days.

(21) Appl. No.: 16/623,498

(22) PCT Filed: Jun. 19, 2018

(86) PCT No.: PCT/EP2018/066174
§ 371 (c)(1),
(2) Date: Dec. 17, 2019

(87) PCT Pub. No.: WO2019/002012
PCT Pub. Date: Jan. 3, 2019

(65) Prior Publication Data
US 2021/0153310 A1    May 20, 2021

(30) Foreign Application Priority Data
Jun. 27, 2017 (EP) ..................... 17178089

(51) Int. Cl.
*G06F 3/041* (2006.01)
*H05B 45/10* (2020.01)
(Continued)

(52) U.S. Cl.
CPC .............. *G06F 3/041* (2013.01); *G06F 3/047* (2013.01); *G06F 3/04144* (2019.05);
(Continued)

(58) Field of Classification Search
CPC ...... G06F 3/041; G06F 1/1643; G06F 1/1647; G06F 2203/04104; G06F 2203/04105;
(Continued)

(56) References Cited

U.S. PATENT DOCUMENTS 9,243,764 B2 *  1/2016  Van Der Zande .. F21V 23/0485
2011/0181207 A1   7/2011  Ross
(Continued)

FOREIGN PATENT DOCUMENTS

EP          2454522 A1      5/2012

OTHER PUBLICATIONS

Miike Grusin, "Serial Peripheral Interface (SPI)", Retrieved from the Internet: URL:https://learn.sparkfun.com/tutorials/serial-peripheral-interface-spi/all.pdf, 2013, pp. 1-8.
(Continued)

*Primary Examiner* — Monica C King

(57) ABSTRACT

The invention provides an improved device with a touch user interface for controlling a load. The device comprising: an array of individually controllable LED light sources; data lines for interconnecting successive LED light sources to obtain a daisy-chain of successive LED light sources in said array and for rippling control data through the daisy-chain to a particular LED light source in said array, wherein the particular LED light source in said array is arranged for removing one or more bits from the control data and for providing resulting control data downstream (i.e. e.g. to a successive LED light source) in the daisy-chain; a feedback line for feeding back the resulting control data; a touchpad for connecting, when in use touched, one of the data lines and the feedback line; a controller comprising (i) an output for sending the control data over said data lines to the particular LED light source, and (ii) an input for receiving the resulting control data over the feedback line when the
(Continued)

touchpad is touched; and the controller being arranged for (i) comparing said sent control data with said received resulting control data for associating the touchpad, when in use touched, with a position in the array of individually controllable LED light sources of the particular LED light source, and (ii) providing a control signal for controlling the load based on said position.

14 Claims, 3 Drawing Sheets

(51) Int. Cl.
  *H05B 45/20* (2020.01)
  *H05B 45/40* (2020.01)
  *H05B 45/305* (2020.01)
  *G06F 3/047* (2006.01)

(52) U.S. Cl.
  CPC ............. *H05B 45/10* (2020.01); *H05B 45/20* (2020.01); *H05B 45/305* (2020.01); *H05B 45/40* (2020.01)

(58) Field of Classification Search
  CPC ........... G06F 2203/04808; G06F 3/013; G06F 3/016; G06F 3/0412; G06F 3/0414; G06F 3/04144; G06F 3/0416; G06F 3/044; G06F 3/045; G06F 3/047; G06F 3/048; G06F 3/04815; G06F 3/04817; G06F 3/0482; G06F 3/04845; G06F 3/04883; G06F 3/04886; G06F 9/4843; H05B 45/10; H05B 45/20; H05B 45/305; H05B 45/40

See application file for complete search history.

(56) References Cited

U.S. PATENT DOCUMENTS

| | | |
|---|---|---|
| 2015/0123569 A1 | 5/2015 | Knaapen et al. |
| 2016/0061476 A1* | 3/2016 | Schultz .................... F24F 11/30 |
| | | 700/276 |
| 2016/0174321 A1 | 6/2016 | Mason et al. |
| 2016/0227635 A1 | 8/2016 | Aliakseyeu et al. |
| 2016/0242251 A1 | 8/2016 | Newton et al. |
| 2021/0129339 A1* | 5/2021 | Pipe-Mazo ............ B25J 9/1641 |
| 2021/0211156 A1* | 7/2021 | Kessler ................ H05B 45/325 |

OTHER PUBLICATIONS

Maxim Integrated, "Daisy-Chaining SPI Devices", Retrieved from the Internet : URL:http://pdfserv.maximintegrated.com/en/an/AN3947.pdf, 2006, pp. 1-8.

* cited by examiner

DEVICE WITH A TOUCH USER INTERFACE FOR CONTROLLING A LOAD, A SYSTEM AND A METHOD THEREOF

CROSS-REFERENCE TO PRIOR APPLICATIONS

This application is the U.S. National Phase application under 35 U.S.C. § 371 of International Application No. PCT/EP2018/066174, filed on Jun. 19, 2018, which claims the benefit of European Patent Application No. 17178089.3, filed on Jun. 27, 2017. These applications are hereby incorporated by reference herein.

FIELD OF THE INVENTION

The invention relates to a device with a touch user interface for controlling a load. The invention further relates to a method of controlling a load with a touch user interface; and to a computer program product. Moreover to a system of controlling a load with a touch user interface.

BACKGROUND OF THE INVENTION

Such a device and/or a method are known from US2015/0123569A1. In an aspect of US2015/0123569A1 a touch-sensitive LED-based lighting fixture is provided. This lighting fixture includes: a flexible light emitting layer having a plurality of individually controllable LED groups, each of the LED groups including at least one LED; a flexible touch-sensitive layer physically segmented into a plurality of touch-sensitive areas; and a controller in electrical communication with the flexible touch-sensitive layer and the flexible light emitting layer, the controller detecting touch events via input from the flexible touch-sensitive layer and directing at least one light output characteristic of the LED groups in correspondence with the touch events.

Furthermore, it is disclosed that the touch-sensitive layer may be a capacitive based touch-sensitive technology. In such a capacitive based touch-sensitive technology, each touch by a user may cause a (location specific) change in a measured capacitance, which may be analyzed by a controller to determine which LED(s) to manipulate in response to the touch. The capacitive measurement may even e.g. take place when the LED's are turned off.

Such a capacitive based touch-sensitive technology is commonly used for controlling electronic devices, because it enables embedding a user interface into an electronic product. A disadvantage of such a capacitive based touch-sensitive technology, as also known from US2015/0123569A, is that each touch sensitive area of the touch sensitive layer needs to be separately connected to a controller.

As there is a demand in industry for larger and customizable (e.g. length) touch sensitive surfaces for a variety of electronic products, there is a need to maintain manufacturing costs, to reduce (wiring) complexity, and to allow scalability of touch sensitive surfaces.

SUMMARY OF THE INVENTION

It is an object of the invention to provide an improved device with a touch user interface for controlling a load, which at least alleviates one of the disadvantages mentioned above. Thereto, the invention provides: A device with a touch user interface for controlling a load, the device comprising: an array of individually controllable LED light sources; data lines for interconnecting the successive LED light sources to obtain a daisy-chain of successive LED light sources in said array and for rippling control data through the daisy-chain to a particular LED light source in said array, wherein the particular LED light source in said array is arranged for removing one or more bits from the control data and for providing resulting control data downstream in the daisy-chain; a feedback line for feeding back the resulting control data; a touchpad for connecting, when in use touched, one of the data lines and the feedback line; a controller comprising (i) an output for sending the control data over said data lines to the particular LED light source, and (ii) an input for receiving the resulting control data over the feedback line when the touchpad is touched; and the controller being arranged for (i) comparing said sent control data with said received resulting control data for associating the touchpad, when in use touched, with a position in the array of individually controllable LED light sources of the particular LED light source, and (ii) providing a control signal for controlling the load based on said position.

Such a device is using the inventive concept of feeding back resulting control data of a particular LED light source (i.e. within an array of individually controllable LED light sources arranged in a daisy-chain) to the controller by means of a feedback line, such that the controller may associate—by comparing the sent control data and the resulting control data—the touchpad, when in use touched, with a position in said array of the particular LED light source. As a result, a touch sensitive area is created using the control data of a LED. This is advantageous over prior art, because touch-sensing in prior art requires a dedicated electrical circuit to actuate a touch sensitive area and a dedicated circuit or micro-controller for the touch detection. In examples with many touch sensitive areas, the circuitry may become too and unnecessary elaborate. These are not required with the improved device with a touch user interface for controlling a load, as advantageously provided by the present invention.

Thus, the wiring infrastructure of the array of individually controllable LED light sources is advantageously used for creating a device with a touch user interface. With said touch user interface, the device may control a load.

Said controller comprises an output for sending control data over the data lines. Said array of individually controllable LED light sources is therefore controlled by the control data sent over the data lines. The data lines are interconnecting successive LED light sources to obtain a daisy-chain of successive LED light sources in said array and for rippling control data through the daisy-chain to a particular LED light source in said array. Each individually controllable LED light source may be able to receive said control data, a particular LED light source in said array may remove one or more bits from the received serial control data, the one or more bits corresponding to their individual control, and may subsequently allow the control data to be sent (i.e. rippling) further downstream (with a reduced data content) over the data lines. That is, downstream in the daisy-chain may indicate to a successive LED light source. Thus, this daisy-chain arrangement allows the control data to be passed from one LED light source within said array of individually controllable LED light sources to e.g. a successive LED light source within said array.

Feeding back the control data over the feedback line, when the touchpad connects one of the data lines and the feedback line, will thus allow the controller to receive the resulting control data. By comparing said sent control data with said (received) resulting control data, the controller is able to associate the touchpad, when in use touched, with a position in the array of individually controllable LED light sources of the particular LED light source. Namely, as each individually controllable LED light source may remove one or more bits from the control data; comparing the content of the resulting control data with the sent control data will render the position of the LED light source at which the one of the data lines is 'shorted' back (as resulting control data) to the controller via the feedback line. In this way, a touch sensitive area is created based on the LED light sources in said array of individually controllable LED light sources. As a result, an array of individually controllable LED light sources may lay the basis for an inventive touch user interface.

Said feedback line may also be termed 'sense line', as it feedbacks the control data after a touch has established a connection between one of the data lines and the feedback line.

Comparing said sent control data with said received resulting control data may comprise comparing a feature or a part of said sent control data and said received resulting control data. Comparing said sent control data with said received resulting control data may moreover comprise reading a data packet comprising instructions to control a particular LED light source. Hence, comparing said sent control data with said received resulting control data may comprise determining a time-delay between the sent control data and the received resulting control data. Based on said time-delay, the controller may be arranged for associating the touchpad, when in use touched, with a position in the array of individually controllable LED light sources of the particular LED light source. The latter comparing (i.e. based on time-delay) of said sent control data with said received resulting control data, is advantageous, because each LED light source comprise a time for passing through the control data. Hence, said time-delay is proportional to the number of LED light sources that are passed, before the control data is fed back over the feedback line. Thus, comparing said sent control data with said received resulting control data may advantageously make use of this feature of the control data to associate the touchpad, when in use touched, with a position in the array of individually controllable LED light sources of the particular LED light source.

Alternatively, in some examples, comparing said sent control data with said received resulting control data may comprise comparing a sent time of the sent control data with a received time of said received resulting control data. Said time may be an internal clock of the controller. In such examples, comparing said sent control data with said received resulting control data may comprise comparing not the elaborate data comprised within the data, but the transmission, the presence, or the reception of the data itself; because it may be assessed how much time control data may take to travel over a particular amount of LED light sources in the array of individually controllable LED light sources. Such examples may provide an advantageous simplified embodiment to the invention.

As mentioned before, the controller may be arranged for providing a control signal for controlling the load based on said position (in the array of individually controllable LED light sources of the particular LED light source). Thus, the array of individually controllable LED light sources serves as a touch user interface for controlling a load. Therefore, said controlled load may be the array of individually controllable LED light sources itself. Hence, in an embodiment, the load comprises any one of the LED light sources in the array of the individually controllable LED light sources. In this way, any one of LED light sources in the array of individually controllable LED light sources may be controlled by touching a touchpad corresponding to any particular LED light source within said array. Each individually controllable LED light source may comprise a corresponding touchpad, wherein said touchpad is arranged for connecting, when in use touched, one of the data lines and the feedback line. Thus, by touching a particular touchpad, which 'shorts' the control data of the particular LED light source to the feedback line, the controller may associate said touchpad (or its corresponding touch) with a position in the array of individually controllable LED light sources of the particular LED light source. As such an association is made, the controller may e.g. control the corresponding particular LED light source, or e.g. any other LED light source within the array of individually controllable LED light sources.

For example, a LED light source may be switched on or off by touching a touchpad corresponding to this LED light source. For example, the series of successive LED light sources in the array of LED light sources, which are situated before the LED light source being associated with a corresponding touch pad and touch, may be switched on or off. To be more specific: suppose an array of individually controllable LED light sources 1 to 10 (arranged in the daisy-chain configuration with interconnecting data lines as mentioned). By touching a touch pad corresponding to e.g. the particular LED light source 8, either only light source 8 is controlled on or off, or LED light sources 1 to 8 are controlled on or off. Here, control options are not limited to the examples given here.

Said embodiment is advantageous, because a device comprising an array of individually controllable LED light source may effectively be provided with a touch user interface, without the addition of unnecessary wiring (to each individual capacitive touch element) common in prior art.

However, the load does not necessarily has to be the array of individually controllable LED light sources itself. As the invention may be focused, amongst others, on creating a touch sensitive area, by advantageously making use of the control data for controlling said array (and feeding this back as resulting control data) to the controller), the load may also be another device suited for control with a touch user interface. Hence, in an embodiment, the load comprises a lighting device or an electronic device. It is advantageous to control a lighting device or an electronic device with the device with a touch user interface according to the invention, because said touch user interface does not require a dedicated microcontroller for each touch sensitive area and does not require a dedicated circuit or micro-controller for the touch detection. Furthermore, as many lighting devices and/or electronic devices may comprise an array of individually controllable LED light sources (arranged in a daisy-chain), the product integration of the device with a touch user interface, according to the invention, and the load may be done with less effort.

Said lighting device may be an indoor luminaire, a table luminaire, a wall luminaire, an illuminating tile, a lamp, a device comprising a lighting fixture, an outdoor luminaire, a semiconductor lighting device such as a LED strip, a pixilated LED spot, and a pixilated LED panel. Said electronic device may be a television, a user interaction device, a computer, a kitchen appliance, such as e.g. an oven, coffeemaker, stove, fridge, etc. Said electronic device may further be a toy, a household appliance, such as a vacuum cleaner, iron or air humidifier; a telecommunication device, a gadget, etc. Any electronic device which may beneficially be controlled by a touch user interface may be suited as the load for this invention.

A larger array of individually controllable LED light sources may provide a larger touch sensitive area, which serves as a touch user interface, because more positions may be provided wherein the control data sent to individually controllable LED light sources may be feedback to the controller by touching a corresponding touchpad. Hence, in an embodiment, the array of the individually controllable LED light sources is at least one of: a LED strip, a pixilated LED spot, and a pixilated LED panel. Such an array of individually controllable LED light sources is advantageous, because such an array provides many individually controllable (LED) nodes. The device according to the invention may therefore comprise a higher resolution touch user interface. Moreover, the present invention enables e.g. a LED strip, a pixilated LED spot, or a pixilated LED panel to serve as a touch user interface. By using the control data, as explained before, of a LED strip, pixilated LED spot, or pixilated LED panel, a simpler and more straightforward touch user interface may be provided, because no longer a dedicated capacitive touchpad, which is separately actuated and wired to a controller, is required.

To provide a higher resolution touch user interface, it may be advantageous to associate a touchpad to each particular LED light source in the array of individually controllable LED light sources. That is: associating the touchpad, when in used touched, with a position in the array of individually controllable LED light sources of the particular LED light source. It may therefore be advantageous to arrange a touchpad close to a LED light source, in between two LED light sources, etc. This may also facilitate connecting one of the data lines with the feedback line. Hence, in an embodiment, the touchpad is arranged in between two successive ones of the LED light sources in the array of the individually controllable LED light sources. In such an embodiment, the touch location of the touchpad may (physically) agree with the associated LED light source.

In an example, the device according to the invention comprises at least one further touchpad for connecting, when in use touched, one of the data lines and the feedback line. In such examples a plurality of touchpads may be provided, which may correspond (e.g. mimic or mirror) to the structure of the array of individually controllable LED light sources. Furthermore, the controller may comprise an input for receiving the plurality of resulting control data over the feedback line when the touchpad and/or the at least one further touchpad is touched. Furthermore, the controller may be arranged for associating the touchpad, when in used touched, wherein the (touched) touchpad may either be the touchpad or the at least one further touchpad, with a position in the array of individually controllable LED light sources of the particular LED light source; and arranged for providing a control signal for controlling the load based on said position. All in all, the device may comprise one touchpad, or a plurality of touchpads, or an array of multiple touchpads, wherein the plurality of touchpads or array of touchpads may correspond to the structure of the array of the individually controllable LED light sources. For example, when said array is a 10×10 matrix, said plurality or array of touchpads may be arranged in a 10×10 matrix as well.

Hence, in an embodiment, according to the invention, the touchpad may be at least one touchpad. More than one touchpad provides more resolution to the touch user interface.

Hence, in an embodiment, the touchpad comprises a plurality of touch sensitive pads, said touch sensitive pads being arranged for association with different ones of the data lines between successive LED light sources in said array. A plurality of touch sensitive pads provides more resolution to the touchpad and consequently the touch user interface. For example, a touchpad may be arranged in a structure mimicking an array of 1×10 individually controllable LED light sources according to the invention, wherein the touchpad covers all 10 LED light sources, however, a plurality of touch sensitive pads may be arranged at locations corresponding to each particular LED light source in said array of individually controllable LED light sources. For example close to the each of the one of the data lines, which interconnect the LED light sources and allow said array to form a daisy-chain of successive LED light sources.

Said touchpad may be a capacitive touch user interface. Said touchpad may be arranged on top of each corresponding individually controllable LED light source. Such a case may for example comprise that a capacitive touch user interface layer is stacked upon a LED layer comprising the LED light source. Said touchpad may be arranged in a flexible layer. Said flexible layer may be separate from a substrate hosting the array of individually controllable LED light sources.

In an embodiment, the touchpad comprises a sliding surface for touch-sensing arranged for associating a touched location on the sliding surface with a position in the array of individually controllable LED light sources of the particular LED light source. Here, the touched location refers to a location on the sliding surface, when in use touched. In such an embodiment, the touchpad may be extended in size to provide a sliding surface for touch-sensing. Such a sliding surface then acts as a simple slider. As one or more bits of the control data may be unique for a particular LED light source in the array of individually controllable LED light sources, it is possible to provide a highly reliable touch user interface with a sliding surface for touch-sensing (slider). Namely, when for example a sliding surface for touch-sensing covers an area corresponding to three different LED light sources in said array, the touched location on the sliding surface may determine at which LED light source (i.e. corresponding one of the data lines through which the control data ripples through the daisy-chain) the resulting control data is feed back to the controller. As the control data may be different for each LED light source, because each LED light source may be arranged for removing one or more bits from the serial control data, the controller may be able to associate the touched location on the sliding surface to a position (in the array of individually controllable LED light sources) of a particular LED light source. Hence, an advantageous touch user interface is provided with a sliding interface. This is particularly advantageous for large arrays of individually controllable LED light sources, such as a LED strip or pixilated LED strip. In an example, a pixilated LED strip may be provided with a continuous (from begin to end of the LED strip) sliding surface for touch sensing.

In an embodiment, the device further comprises a memory arranged for storing a history of touching the touchpad; and wherein the controller is arranged for providing a control signal for controlling the load based on said history. Such a memory may store all the information related to touching the touchpad. This allows the device, and in particular the controller, to analyze touching patterns. For example, when a touch user input is repeated consecutively, a specific control signal may be provided corresponding to said repetition, for example increase intensity. For example, in case e.g. two touchpads are present, touching the second touchpad and then the first touchpad, may result in a control signal to switch on all lights in between the LED light sources associated with the first touchpad and second touchpad. Thus, a plurality of possibilities may be provided by providing the device with a memory arranged for storing a history of touching the touchpad. Such an embodiment is advantageous, because a more sophisticated and improved device is provided with a touch user interface for controlling a load.

In an alternative embodiment, said memory may be hosted in the touchpad. Thus, the device according to the invention is provided, wherein the memory is arranged within the touchpad. This may for example be a pin of the touchpad, wherein a local memory or register.

In an embodiment, the device further comprises a timer arranged for recording a time value of the duration of touching the touchpad; and wherein the controller is arranged for providing a control signal for controlling the load based on said time value. Such a timer may record the time duration related to touching the touchpad. This allows the device, and in particular the controller, to analyze touching patterns based on duration. For example, when a touch user input is hold for a long duration (e.g. 2 or 3 seconds), a specific control signal may be provided corresponding to said hold for a long duration, such as putting the load to a standby modus instead of off. Thus, a plurality of possibilities may be provided by providing the device with a timer arranged for recording a time value of the duration of touching the touchpad. Such an embodiment is advantageous, because a more sophisticated and improved device is provided with a touch user interface for controlling a load.

Said timer may also be implemented for comparing said sent control data with said received resulting control data for associating the touchpad, when in use touched, with a position in the array of individually controllable LED light sources of the particular LED light source. Hence, the control of the device according to the invention, and/or the concept of comparing said sent control data with said received resulting control data, may as mentioned before be based on identifying a time-delay.

In an embodiment, the device according to the invention is provided, wherein the particular LED light source in the array of the individually controllable LED light sources comprises a lighting property; wherein the controller is arranged for retrieving the lighting property based on the position of the particular LED light source, and for providing a control signal for controlling the load based on said lighting property; and wherein the lighting property comprises at least one of: a light color, a light color temperature, a light modulation, a beam width, and a light intensity. Such an embodiment is advantageous, because a more sophisticated and improved device is provided with a touch user interface for controlling a load, because the load may be controlled based on said lighting property (of the particular LED light source). For example: The load may be a lighting device. The array of individually controllable LED light sources may comprise a lighting property of light color. More specifically, the array of individually controllable LED light sources may comprise a color palette, wherein each individually controllable LED light source emits a different color of light. The controller may subsequently be arranged for, as the invention describes, comparing said sent control data with said received resulting control data for associating the touchpad, when in used touched, with a position in the array of individually controllable LED light sources of the particular LED light source. Subsequently, the controller may be arranged for retrieving the lighting property based on the position of the particular LED light source, and for providing a control signal for controlling the load based on said lighting property. In case the particular LED light source emits the color red, the controller may be arranged for providing a control signal for controlling the load, here said lighting device, based on said lighting property, that is: set the light of the lighting device to red. Alternatively, the color red in the array of individually controllable LED light sources may also be used for providing a control signal to turn off a load, whereas another touch user input corresponding a LED light source emitting a green color may ultimately be used for providing a control signal to turn on a load. Thus, a plurality of possibilities may be provided.

The array of individually controllable LED light sources arranged in a daisy-chain may be more prone to a defect of a single LED light source, which defect may cause control data rippling through the daisy-chain to a particular LED light source in said array to be interrupted. More robustness may be provided by a robust daisy chain arrangement, wherein, in some examples, the device according to the invention may comprise auxiliary data lines for additionally connecting any one of the LED light sources in the daisy-chain with their respective N preceding and N successive LED light sources in the daisy chain. N may preferably be 2, or 3, or at least 2. Thus, in case of N is 2, as long as there are no two defect neighboring components in the daisy-chain, the array of individually controllable LED light sources may function accordingly.

It is a further object of the invention to provide an improved system of controlling a load with a touch user interface. Hence, the invention provides, a system of controlling a load with a touch user interface, the system comprising the device according to the invention and a load, wherein the load comprises an electronic device. Said electronic device may be a lighting device, or may be a part of the device according to the invention. Such a system is advantageous, because an improved system is provided for controlling a load, which contrary to prior art does not require dedicated electrical circuit to actuate a touch sensitive area and a dedicated circuit or micro-controller for the touch detection. This provides a simpler, less expensive, less elaborate (due to less wiring) system of controlling a load with a touch user interface.

Said system may be embodied within a lighting object. Said lighting object may be part of outdoor lighting, or a lighting infrastructure.

It is a further object of the invention to provide an improved lighting apparatus for controlling a load of the lighting apparatus with a touch user interface. Hence, the invention provides, a lighting apparatus for controlling a load with a touch user interface, the lighting apparatus comprising the device according to the invention and the load. The load may mechanically be connected to the lighting apparatus. The lighting apparatus may comprise a wireless connection to synchronize said load and said control of said load with a further lighting apparatus according to the invention. Hence, the touch user interface of the lighting apparatus may control the load of the further lighting apparatus.

It is a further object of the invention to provide an improved method of controlling a load with a touch user interface, which at least alleviates one of the disadvantages mentioned before. Thereto, the invention provides a method of controlling a load with a touch user interface, the method comprising: sending control data over data lines to a particular LED light source in an array of individually controllable LED light sources, wherein said data lines are arranged for interconnecting successive LED light sources to obtain a daisy-chain of successive LED light sources in said array; removing, with the particular LED light source, one or more bits from the control data and providing, over the data lines, the resulting control data downstream in the daisy-chain; connecting, with a touchpad when in use touched, one of the data lines with a feedback line; receiving the resulting control data over the feedback line when the touchpad is touched; comparing said sent control data with said received resulting control data for associating the touchpad, when in use touched, with a position in the array of individually controllable LED light sources of the particular LED light source; and providing a control signal for controlling, with said controller, the load based on said position. Said sending, receiving and comparing may e.g. be done respectively with an output of a controller, with an input of said controller, and e.g. with said controller.

Such a method is, as partly and similarly mentioned before, using the inventive concept of feeding back the resulting control data of a particular LED light source (within an array of individually controllable LED light sources) to the controller by means of a feedback line, such that the controller may associate—by using the control data of a LED light source—a touchpad with a position in said array of the particular LED light source in said array. As a result, a touch sensitive area is created using the control data of a LED. This is advantageous over prior art, because touch-sensing in prior art requires a dedicated electrical circuit to actuate a touch sensitive area and a dedicated circuit or micro-controller for the touch detection. These are not required with the improved method with a touch user interface for controlling a load, as advantageously provided by the present invention.

In an embodiment, the method according to the invention is provided, the method comprising: storing, in a memory, a history of touching the touchpad; and wherein the providing a control signal for controlling the load is based on said history. In such a memory all the information related to touching the touchpad may be stored. This enables the device, and in particular the controller, to analyze touching patterns and provide a desired further control signal based thereon. Hence, such an embodiment is advantageous, because a more sophisticated and improved method is provided of controlling a load with a touch user interface.

In an embodiment, the method according to the invention is provided, the method comprising: recording a time value of the duration of touching the touchpad; and wherein the providing a control signal for controlling the load is based on said time value. Such a time value of the duration of touching the touchpad enables the device, and in particular the controller, to analyze touching patterns and provide a desired control signal based thereon. Hence, such an embodiment is advantageous, because a more sophisticated and improved method is provided of controlling a load with a touch user interface.

The invention further relates to a computer program product for a computing device. Hence, the invention provides a computer program product for a computing device, the computer program product comprising computer program code to perform the methods of the present invention mentioned above when the computer program product is run on a processing unit of the computing device; wherein the computer program product may be executed by a computing device associated with the device according to the invention. The computer program product may advantageously provide control of a load, as described for the methods according to the invention.

Thus, aspects of the invention may be implemented in a computer program product, which may be a collection of computer program instructions stored on a computer readable storage device which may be executed by a computer. Said computer may be associated with the device according to the invention. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

BRIEF DESCRIPTION OF THE DRAWINGS

The invention will now be further elucidated by means of the schematic non-limiting drawings.

DETAILED DESCRIPTION OF THE EMBODIMENTS

Figure 1:
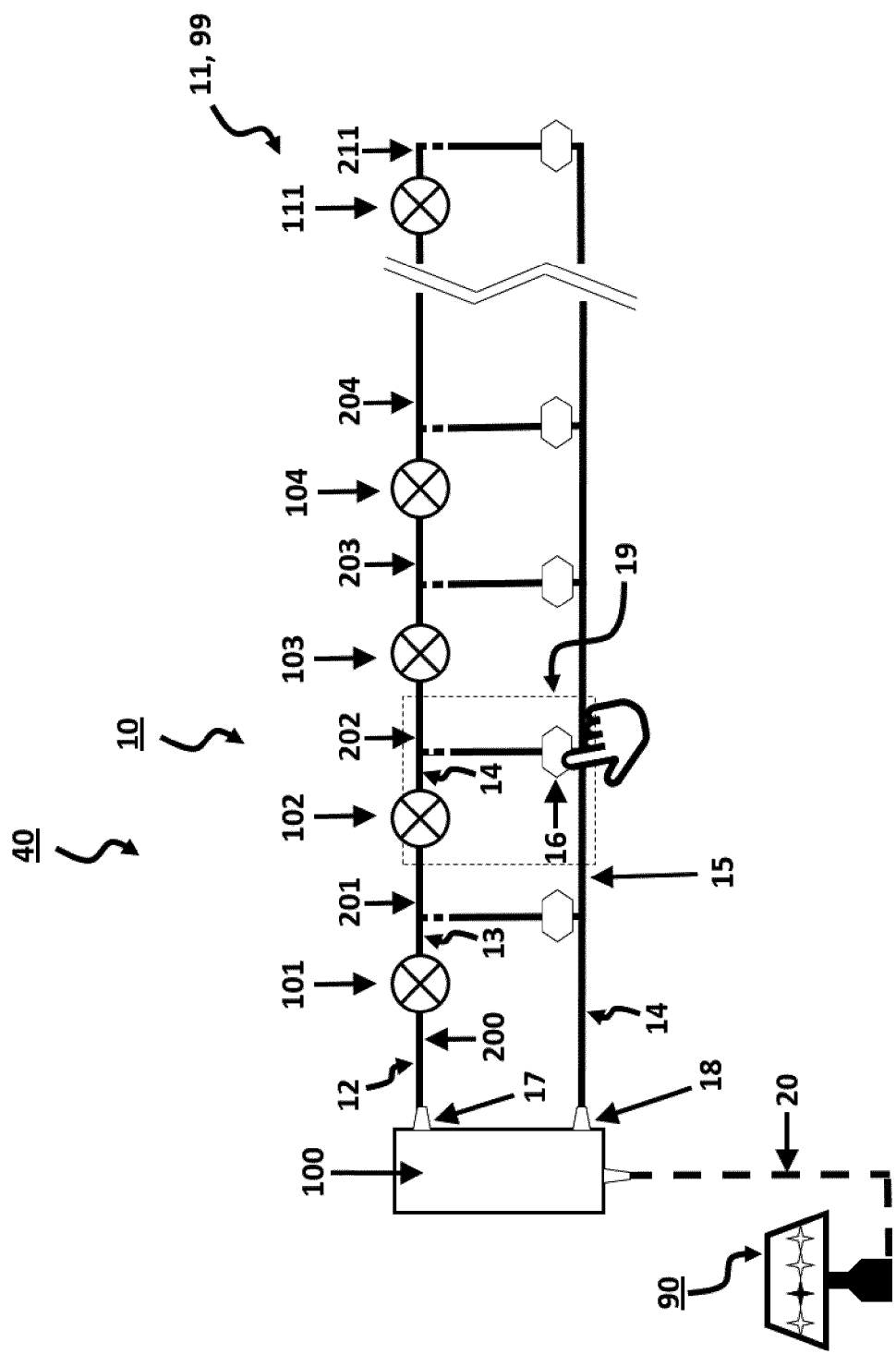
FIG. 1 depicts schematically an embodiment of a system of controlling a load with a touch user interface, the system comprising the device according to the invention and a load, wherein the load is a lighting device.

FIG. 1 depicts schematically, by non-limiting example, an embodiment of a system 40 of controlling a load 90 with a touch user interface, the system 40 comprising (i) a device 10 with a touch user interface for controlling a load 90 and (ii) the load 90. The load 90 is a lighting device, here e.g. a table luminaire, but may alternatively be any other lighting device or an electronic device, such as a television, a computer, a kitchen appliance, a toy, a household appliance, a gadget, etc. The load 90 may alternatively be a part of the device 10 with a touch user interface for controlling a load, according to the invention. In such examples, the device 10 provides a touch user interface for controlling its own load, for example an array of individually controllable light sources.

The device 10 comprises a controller 100. Furthermore, the device 10 comprises an array 11 of individually controllable LED light sources 101, 102, 103, 104, . . . , 111. Said array 11 comprises eleven individually controllable LED light sources 101, 102, 103, 104, . . . , 111 (not all depicted). The device 10 further comprises data lines 200, 201, 202, 203, 204, . . . , 211, (not all depicted) for interconnecting successive LED light sources 101, 102, 103, 104, . . . , 111 to obtain a daisy-chain 99 of successive LED light sources in said array 11. For example, LED light source 102 and LED light source 103 are successive and interconnected by data line 202. Said data lines 200, 201, 202, 203, 204, . . . , 211 are furthermore (arranged for) rippling control data 12 (implicitly depicted as reference 12, because control data is comprised within the data lines as a data coding) through the daisy-chain 99 to a particular LED light source 102 in said array. The particular LED light source in this example is LED light source 102, but may alternatively be any other individually controllable LED light source 101, 103, 104, 111 in said array 11.

Moreover, the particular LED light source 102 in said array 11 removes one or more bits from the control data 13 and provides resulting control data 14 to the successive LED light source 103 the daisy chain. For example, control data 13 may be coded BCD (each letter representing bits), wherein the particular LED light source 102 may remove data B from the control data 13. The resulting control data 14 provided to the successive LED light source 13 will then be CD. Here, the control data 13 is equal to control data 12 because the first LED light source in the array 11 of individually controllable LED light sources 101, 102, 103, 104, . . . , 111 does not remove one or more bits from the control data 12. The control data 12 is sent by the controller 100.

In an alternative example, however, each of the individually controllable LED light sources is arranged for removing one or more bits from the respective control data and resulting control data. Hence, the first LED light source 101 in the daisy-chain 99 removes, in this alternative example, one or more bits from the control data 12 sent by the controller, and subsequently provides resulting control data 13 to the successive LED light source 102 in the daisy-chain 99. The resulting control data 13 is now the control data 13 for the successive LED light source 102, which subsequently removes one or more bits from the control data 13 and provides resulting control data 14 to the successive LED light source 103 in the daisy-chain 99. This 'process' may continue for each individually controllable LED light source in the daisy-chain 99 which has to remove one or more bits from the control data in order to be controlled. All in all, the control data 12 leaving the controller 100 may ripple through the array 99 of individually controllable LED light sources 101, 102, 103, 104, . . . , 111.

Referring to the embodiment depicted in FIG. 1, the device 10 further comprises a feedback line 15. The feedback line 15 feeds back the resulting control data 14 to the controller 100. The device 10 further comprises a touchpad 16 for connecting, when in use touched, the data line 202 and the feedback line 15. The controller 100 comprises an output 17 for sending the control data 12 (here control data 12 is control data 13 as mentioned before) (rippling) over said data lines 200, 201 to the particular LED light source 102. The controller 100 also comprises an input 18 for receiving the resulting control data 14 over the feedback line 15 when the touchpad 16 is touched.

Said touchpad 16 is arranged in between two successive LED light sources 102, 103 in the array 11 of individually controllable LED light sources 101, 102, 103, 104, . . . , 111. This is preferred, because the touchpad may be close to the data lines. Alternatively, said touchpad may be arranged at another location. For example, said touchpad may be located separately from the array of individually controllable LED light sources. For example, considering said array of individually light sources is integrated in a product, said array may be on one surface of the product, while the touchpad (or an array of corresponding touchpads) may be similarly arranged on another surface. Alternatively, said touchpad may be arranged on top of the particular LED light source in said array. For example integrated on one light emitting touch sensitive device. Furthermore, in alternative embodiments, the touchpad may comprise a plurality of touch sensitive pads, wherein each pad is arranged for serving as the touch pad according to the invention, such that the touch sensitive pad may connect, when in use touched, one of the data lines with the feedback line. Furthermore, said touchpad may be arranged on a substrate or on a flexible layer.

Still referring to the embodiment depicted in FIG. 1, the controller 100 compares said sent control data 12 with said received resulting control data 14. In this way, the controller 100 associates the touchpad 16, when in use touched, with a position 19 in the array 11 of individually controllable LED light sources 101, 102, 103, 104, . . . , 111 of the particular LED light source 102. Thus, the position 19 of the particular LED light source 102 within said array 11 is identified.

The controller 100 further provides a control signal 20 for controlling the load 90 based on said position 19. Here, the load 90 comprises a table luminaire comprising eleven light sources circumferentially on a cover. Alternatively, this may be any other configuration of light sources within the table luminaire. As the position 19 of the particular LED light source 102 in the array 11 of individually controllable LED light sources is the 'second location' within the daisy-chain 99 of successive LED light sources 101, 102, 103, 104, 105, 111 in said array 11, the position of the 'second light source' on the cover of the load 90 (i.e. the table luminaire) is controlled to be in an on state, alternatively to be off.

Alternatively, other control may be envisioned. For example, switching the whole load on or off. Alternatively, a programmed feature of the table luminaire may be controlled by the touch user interface, or the intensity of light output, or the color, as the 'second location' within the daisy-chain of successive LED light sources 101, 102, 103, 104, 105, . . . , 111 in said array 11 may correspond to the color blue or red. Such options or smart control are not limited to the ones described here.

Considering the embodiment depicted in FIG. 1, it is clear that a device 10 and system 40 are provided, in which the inventive concept is applied of feeding back resulting control data 14 of a particular LED light source 102 (within an array 11 of individually controllable LED light sources 101, 102, 103, 104, . . . , 111 arranged in a daisy-chain with interconnecting data lines 200, 201, 202, 203, 204) to the controller 100 by means of a single feedback line 15. Consequently, the controller 100 may associate, by comparing the sent control data 12 and the resulting control data 14, the touchpad 16, when in use touched, with a position 19 in said array 11 of the particular LED light source 102. As a result, a touch sensitive area is created using the control data of a LED. This is advantageous over prior art, because touch-sensing in prior art requires a dedicated electrical circuit to actuate a touch sensitive area and a dedicated circuit or micro-controller for the touch detection.

In an embodiment, not depicted, by non-limiting example, a device is provided partly similar to the embodiment depicted in FIG. 1, but wherein now the controller compares the send time of said sent control data with the reception time of said received control data. The controller may determine, based e.g. on an internal clock, said send time and said reception time. As each LED light source in the array of individually controllable LED light sources comprises a (pre) known time-delay for rippling the sent control data, the amount of LED light sources passed through in the daisy-chain by the control data may be determined by the controller. In this way, by comparing said send time and said reception time, the controller associates the touchpad, when in use touched, with a position in the array of individually controllable LED light sources of the particular LED light source. Thus, the position of the particular LED light source within said array is identified.

Yet alternatively, said sent time of said sent control data may be comprised within the sent control data itself. Said reception time may then be determined by the controller, e.g. by an internal clock indicating the time of reception. In this manner, the sent control data may be compared with the received control data.

Figure 2:
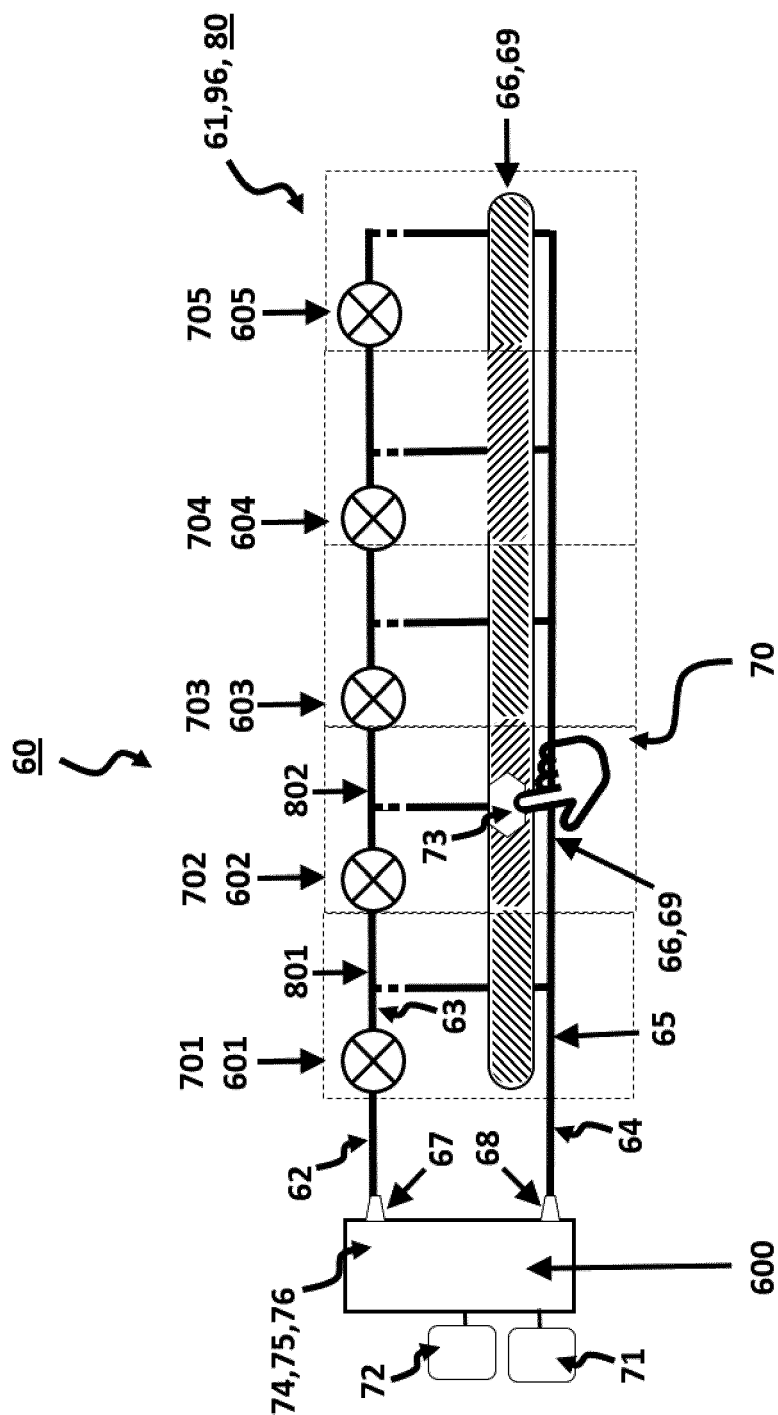
FIG. 2 depicts schematically an embodiment of a device with a touch user interface for controlling a load.
Figure 3:
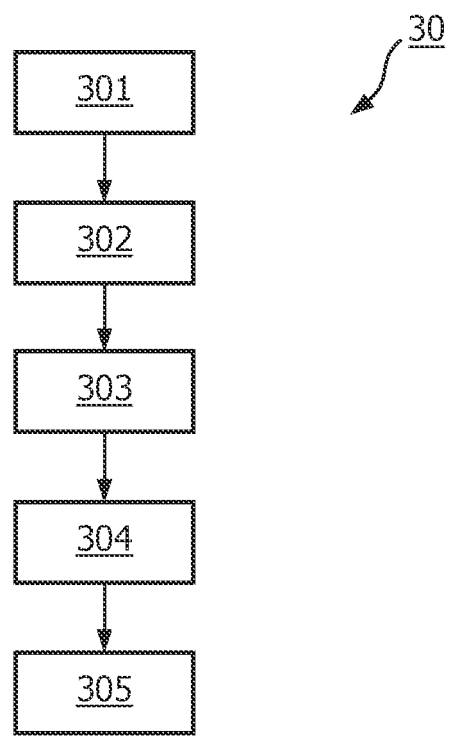
FIG. 3 depicts schematically, within a flowchart, an embodiment of a method of controlling a load with a touch user interface.

FIG. 2 depicts schematically, by non-limiting example, an embodiment of a device 60 with a touch user interface for controlling a load 80. Said device 60 is partly similar to the embodiment depicted in FIG. 1, but wherein: (i) the array 61 of individually controllable LED light sources 601, 602, 603, 604, 605 comprises five individually controllable LED light sources 601, 602, 603, 604, 605; and (ii) the load 80 is any one of the LED light sources 601, 602, 603, 604, 605 in the array 61 of individually controllable LED light sources; and (iii) the touchpad 66 comprises a sliding surface for touch sensing 69 (may alternatively be a touchpad without sliding surface similar to the embodiment depicted in FIG. 1); and (iv) the device 60 comprises further a timer 71 and a memory 72.

As mentioned, the array 61 of individually controllable LED light sources 601, 602, 603, 604, 605 comprises five individually controllable LED light sources 601, 602, 603, 604, 605. The load 80 is any one of the LED light sources 601, 602, 603, 604, 605 in the array 61 of individually controllable LED light sources. Consequently, the array 61 may be considered as a short LED strip with five successive LED light sources. Similarly to the embodiment depicted in FIG. 1, the device 60 comprises data lines 801, 802, (not all referred to in FIG. 2) for interconnecting the successive five LED light sources 601, 602, 603, 604, 605 to obtain a daisy-chain 96 of successive LED light sources in said array 61.

Alternatively, said array 61 may be one of: a LED strip, a pixilated LED spot, and a pixilated LED panel; wherein an amount of N individually controllable LED light sources may be present in a matrix with rows Z and columns Y. (For a LED strip arrangement, Z is much larger than Y, or vice versa). As the present invention becomes even more beneficial for larger number of N, the value of N may for example be a hundred, a thousand, or at least eight hundred, or at least a hundred, for example hundred fifty. With larger N, the device according to the invention may comprise a higher resolution touch user interface.

Referring to the embodiment depicted in FIG. 2, the touchpad 66 comprises a sliding surface for touch sensing 69. Said sliding surface for touch sensing 69 associates the touched location 73 on the sliding surface 69 with a position 70 in the array 61 of individually controllable LED light sources 601, 602, 603, 604, 605 of the particular LED light source 602. Alternatively, the particular LED light source may by any other LED light source within said array; and the position in the array of the particular LED light source may correspond accordingly to that choice of the particular LED light source. Such a sliding surface for touch sensing 69, which is continuously extending along the length covered by said five LED light sources 601, 602, 603, 604, 605, is particularly advantageous for large arrays of individually controllable LED light sources, such as a LED strip or pixilated LED strip.

Similarly to the embodiment depicted in FIG. 1, the embodiment depicted in FIG. 2 comprises a device 60, which comprises a controller 600; data lines 801, 802, (not all referred to in FIG. 2); and a feedback line 65. The controller 600 comprises an output 67 for sending control data 62 over said data lines 801, 802, (not all referred to in FIG. 2) to the particular LED light source 602. Said data lines 801, 802, (not all referred to in FIG. 2) interconnect the five successive LED light sources to obtain a daisy-chain 96 of successive LED light sources in said array 61 and for rippling control data 12 through the daisy-chain 96 to a particular LED light source 602 in said array 61, wherein each LED light source 601, 602, 603, 604, 605 (including the particular LED light source 602 in said array 61) in said array 61 is arranged for removing one or more bits from the respective control data 62, 63, (other control data and other resulting control data not depicted) and for providing resulting control data 63, (other control data and other resulting control data not depicted) to the successive LED light source 603 in the daisy-chain 96.

The controller moreover comprises an input 68 for receiving the resulting control data 64 over the feedback line 65. The touchpad 66, comprising the sliding surface for touch sensing 69, connects, when in use touched, one of the data lines—in this FIG. 2 the data line 802—and the feedback line 65.

Still referring to the embodiment depicted in FIG. 2, the controller 600 compares said sent control data 62 with said received resulting control data 64. In this way, the controller 600 associates the touchpad 66, when in use touched, with a position 70 in the array 61 of individually controllable LED light sources 601, 602, 603, 604, 605 of the particular LED light source 602. Thus, the position 70 of the particular LED light source 602 within said array 61 is identified.

The controller 100 further provides a control signal 74 for controlling the load 80 based on said position 70; the load 80 being the array 61 of individually controllable LED light sources 601, 602, 603, 604, 605. Alternatively, said load may be another device, such as a lighting device or an electronic device. Furthermore, in an embodiment, each LED light source 601, 602, 603, 604, 605 in the array 61 of individually controllable LED light sources 601, 602, 603, 604, 605 comprises a lighting property 701, 702, 703, 704, 705. Said lighting property 701, 702, 703, 704, 705 comprises a light color emitted by said respective LED light sources. Alternatively, said lighting property may be a light color temperature, a light modulation, or a light intensity. Here, the controller 600 is further arranged for retrieving the lighting property 702 based on the position 70 of the particular LED light source 602, and for providing a control signal 74 for controlling the load 80 based on said lighting property 702.

For example, here, the array 61 of individually controllable LED light sources 601, 602, 603, 604, 605 comprises a color palette, wherein the LED light source 601 is emitting deep red color; the LED light source 602 is emitting red color; the LED light source 603 is emitting green color; the LED light source 604 is emitting blue color; and the LED light source 605 is emitting purple color. Hence, the position 70 corresponds to the lighting property 702 of red light color. The controller 600 retrieves the lighting property 702 based on said position 70. As the controller is also controlling the particular LED light source 602 corresponding to said position 70, said retrieving may be an internal process in the controller 600. Subsequently, the processor provides a control signal 74 for controlling the load 80 based on said lighting property 702. In this example, the control signal 74 is that all individually controllable LED light sources in the array 61 of individually controllable LED light sources turn into the color red corresponding to the lighting property 70 for a defined period of time. For example, a second touch on the established touch user interface of the device may trigger a control signal back to the color palette defined before. As a result, an interactive touch user interface is established based on the inventive concept of feeding back the control data of the individually controllable LED light sources, as mentioned in this invention.

In alternative examples, the individually controllable LED light sources may comprise a modulation of emitted light, (may e.g. be coded light such as VLC or general blinking light); wherein, when a touchpad, when in use touched, connects one of the data lines with the feedback line, the individually controllable LED light sources arranged in the daisy-chain before the specific LED light source corresponding to said touched touchpad take over the modulation property. Alternatively, all individually controllable LED light sources arranged in the vicinity or arranged after said specific LED light source may emit said modulation property. Hence, as a result, multiple control options may be envisioned by touching the touchpad. For example, a specific touch may turn the device on, off, or in sleep mode. For example, in general, touching a touchpad corresponding to a red light emitting LED light source may turn a function of the device off, while a green light may turn a function of the device on.

Still referring to the embodiment depicted in FIG. 2, the device 60 further comprises a memory 72. Said memory 72 is arranged for communicating with the controller 600. Said memory 72 stores a history of touching the touchpad 66, 73. The controller 600 is then providing a control signal 75 for controlling the load 80 based on said history. In an alternative embodiment, similar to the embodiment depicted in FIG. 2, the memory may be omitted or may be separate but e.g. in wireless connection to said device. For example, here, touching the touchpad 66 at the touched location 73 is stored in memory 72. A subsequent touch is also stored. This touch may e.g. be done the touchpad corresponding to individually controllable LED light source 605. A further subsequent touch is also stored. This touch may e.g. be done the touchpad corresponding to individually controllable LED light source 604. As the touchpad 66 comprises a sliding surface 69, said touches may not have to be discrete or discontinuous, but may be done in a swipe movement. As a result, the memory has stored the combination of touches corresponding to the sequence of the second individually controllable LED light source 602 in the daisy-chain 96, the fifth individually controllable LED light source 605 in the daisy-chain 96, and the third individually controllable LED light source 603 in the daisy-chain 96. This combination or sequence may give a control signal 75 corresponding to locking or unlocking a function of a device. A touching sequence of consecutively touching the touchpad corresponding to the individually controllable LED light sources in the daisy-chain may provide a control signal of increasing or decreasing a function (e.g. light intensity) of the device according to the invention.

Hence, the memory 72 may store all the information related to touching the touchpad or any touchpad comprised within the device. This allows the device 60, and in particular the controller 600, to analyze touching patterns. Thus, a more sophisticated and improved device 60 is provided with a touch user interface for controlling a load. Said touching patterns and corresponding control are not limited to the examples given here.

Still referring to the embodiment depicted in FIG. 2, the device 60 further comprises a timer 71. The timer 71 records (either independently as indicated here with a temporal internal memory or alternatively in connection with memory 72) a time value of the duration of touching the touchpad 66. The controller 600 subsequently provides a control signal 76 for controlling the load 80 based on said time value. In an alternative embodiment, similar to the embodiment depicted in FIG. 2, the timer may be omitted or may be separate but e.g. in wireless connection to said device. Here, the control signal 76 is provided when the touched touchpad 66, which comprises a sliding surface 69 onto which the touch is performed corresponding to touching location 73, is touched for a time duration longer than a threshold value of at least one and a halve seconds. This threshold value may alternatively be at least one, at least two, or at least three seconds. Here, said control signal 76 is a reset signal back to emitting said color palette initially emitted by the load 80. Alternatively, touching the touchpad for an increasing duration of time may linearly increase the intensity of the colors in the color palette, change the color temperature, etc.

Hence, the timer 71 may record all the information related to touching the touchpad. This allows the device 60, and in particular the controller 600, to analyze transient touching patterns. Thus, a more sophisticated and improved device 60 is provided with a touch user interface for controlling a load. Said transient touching patterns and corresponding control are not limited to the examples given here.

FIG. 2 depicts schematically, by non-limiting example, a method 30 of controlling a load with a touch user interface. The method 30 comprises (300) sending, with an output of a controller, control data over data lines to a particular LED light source in an array of individually controllable LED light sources. This control data comprises the command, amongst a list of commands dedicated to each individually controllable LED light source in said array, to turn the particular LED light source to a color green. Alternatively, other control commands may be send to said particular LED light source. Said data lines are arranged for interconnecting successive LED light sources to obtain a daisy-chain of successive LED light sources in said array. Further the method comprises, (301) removing, with the particular LED light source, one or more bits from the control data and providing, over the data lines, resulting control data to a successive LED light source in the daisy-chain. The resulting control data does not comprise the command of turning the particular LED light source to the color green anymore, as the one or more bits corresponding to this control data are removed from the sent control data. Further, the method 30 comprises, (302) connecting, with a touchpad when in use touched, one of the data lines with a feedback line; (303) receiving, with an input of the controller, the resulting control data over the feedback line when the touchpad is touched. Further, (304) comparing, with said controller, said sent control data with said received resulting control data for associating the touchpad, when in used touched, with a position in the array of individually controllable LED light sources of the particular LED light source; and (305) providing a control signal for controlling, with said controller, the load based on said position. Thus, the controller may identify or associate the touchpad, when in use touched, with a position in the array of individually controllable LED light sources of the particular LED light source. This position may for example be the 'third LED light source' in the daisy-chain. According to this position, a load may e.g. be controlled to perform a function relating to three (e.g. send sound level or light intensity to third modus).

As a result of this method 30, a touch sensitive area is created using the control data of a LED. This is advantageous over prior art, because touch-sensing in prior art requires a dedicated electrical circuit to actuate a touch sensitive area and a dedicated circuit or micro-controller for the touch detection. These are not required with the improved method with a touch user interface for controlling a load, as advantageously provided by the present invention.

In an embodiment, not depicted here, the method 30 of controlling a load with a touch user interface may alternatively comprise: storing, in a memory, a history of touching the touchpad; providing a control signal for controlling, with said controller, the load based on said history. In said example, when e.g. the touchpad is touched three times consecutively, this history of touching the touchpad is stored in the memory and the controller provides based thereon a control signal to turn the load off or in a standby modus. As the memory allows more elaborate control options, many control options are possible and are not limited to the example provided here.

In an embodiment, not depicted here, the method 30 of controlling a load with a touch user interface may alternatively comprise: recording a time value of the duration of touching the touchpad; providing a control signal for controlling, with said controller, the load based on said time value. In said example, when e.g. the touchpad is touched for three seconds, this duration of touching the touchpad is recorded by the timer and the controller provides based thereon a control signal to increase a function of the load.

Figure 4:
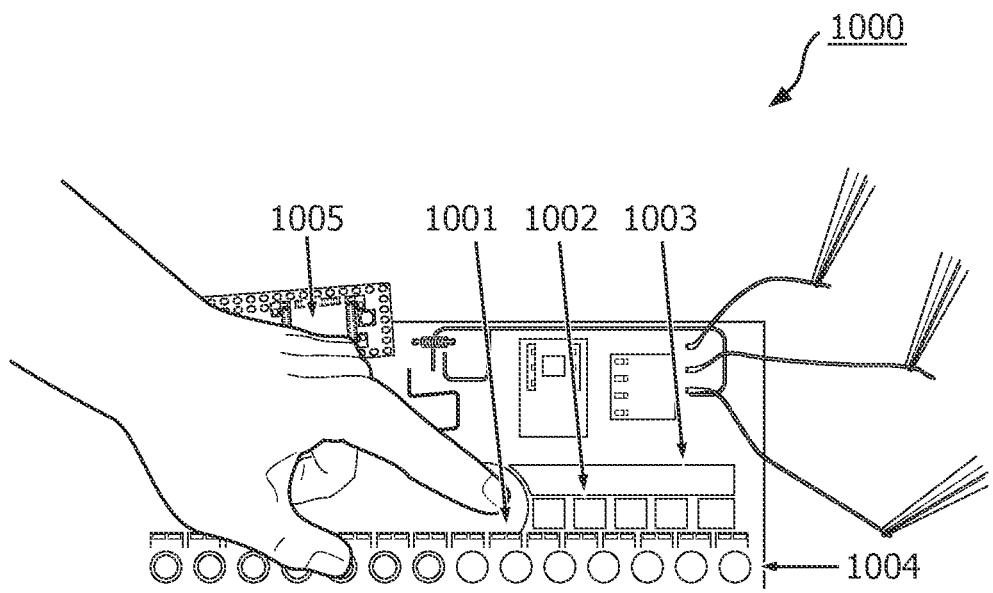
FIG. 4 depicts a picture of a prototype similar to the embodiment depicted in FIG. 2 of a device with a touch user interface for controlling a load, wherein the load is an array of individual controllable LED light sources comprises by the device.

FIG. 4 depicts, by non-limiting example, a picture of a prototype similar to the embodiment depicted in FIG. 2 of a device 1000 with a touch user interface for controlling a load 1004, wherein the load 1004 is an array 1004 of individual controllable LED light sources comprises by the device 1000. Similar to the embodiment depicted in FIG. 2, the device comprises a controller 1005, a particular LED light source 1001 in the array 1004 of individually controllable LED light sources, a touchpad 1002 and a feedback line 1003. Said prototype is an example.

The invention claimed is:

1. A device with a touch user interface for controlling a load, the device comprising:
an array of individually controllable LED light sources;
data lines for interconnecting successive LED light sources to obtain a daisy-chain of the successive LED light sources in said array and for rippling control data through the daisy-chain to a particular LED light source in said array, wherein the particular LED light source in said array is arranged for removing one or more bits from the control data and for providing resulting control data downstream in the daisy-chain;
a feedback line for feeding back the resulting control data;
a touchpad for connecting, when in use touched, one of the data lines and the feedback line;
a controller comprising:
(i) an output for sending the control data over said data lines to the particular LED light source, and
(ii) an input for receiving the resulting control data over the feedback line when the touchpad is touched; and
the controller being arranged for:
(i) comparing said sent control data with said received resulting control data for associating the touchpad, when in use touched, with a position in the array of individually controllable LED light sources of the particular LED light source, and
(ii) providing a control signal for controlling the load based on said position; and
a memory arranged for storing a history of touching the touchpad, wherein the controller is arranged for providing a control signal for controlling the load based on said history.

2. The device according to claim 1, wherein the load comprises any one of the LED light sources in the array of the individually controllable LED light sources.

3. The device according to claim 1, wherein the load comprises a lighting device or an electronic device.

4. The device according to claim 1, wherein the array of the individually controllable LED light sources is at least one of: a LED strip, a pixilated LED spot, and a pixilated LED panel.

5. The device according to claim 1, wherein the touchpad is arranged in between two successive ones of the LED light sources in the array of the individually controllable LED light sources.

6. The device according to claim 1, wherein the touchpad comprises a plurality of touch sensitive pads, said touch sensitive pads being arranged for association with different ones of the data lines between successive LED light sources in said array.

7. The device according to claim 1, wherein the touchpad comprises a sliding surface for touch-sensing arranged for associating a touched location on the sliding surface with a position in the array of individually controllable LED light sources of the particular LED light source.

8. The device according to claim 1, wherein the device further comprises a timer arranged for recording a time value of the duration of touching the touchpad; and
wherein the controller is arranged for providing a control signal for controlling the load based on said time value.

9. The device according to claim 1,
wherein the particular LED light source in the array of the individually controllable LED light sources comprises a lighting property;
wherein the controller is arranged for retrieving the lighting property based on the position of the particular LED light source, and for providing a control signal for controlling the load based on said lighting property; and
wherein the lighting property comprises at least one of: a light color, a light color temperature, a light modulation, a beam width, and a light intensity.

10. A system of controlling a load with a touch user interface, the system comprising the device according to claim 1 and a load, wherein the load comprises an electronic device.

11. A method of controlling a load with a touch user interface, the method comprising:
sending control data over data lines to a particular LED light source in an array of individually controllable LED light sources, wherein said data lines are arranged for interconnecting successive LED light sources to obtain a daisy-chain of successive LED light sources in said array;
removing, with the particular LED light source, one or more bits from the control data and providing, over the data lines, resulting control data downstream in the daisy-chain;
connecting, with a touchpad when in use touched, one of the data lines with a feedback line;
receiving the resulting control data over the feedback line when the touchpad is touched;
comparing said sent control data with said received resulting control data for associating the touchpad, when in use touched, with a position in the array of individually controllable LED light sources of the particular LED light source;
providing a control signal for controlling, with said controller, the load based on said position; and storing, in a memory, a history of touching the touchpad; and wherein the providing a control signal for controlling the load is based on said history.

12. The method of controlling a load with a touch user interface according to claim 11, and comprising: recording a time value of the duration of touching the touchpad; and wherein the providing a control signal for controlling the load is based on said time value.

13. A computer program product for a computing device, the computer program product comprising computer program code to perform the method of claim 11, when the computer program product is run on a processing unit of the computing device.

14. A system of controlling a load with a touch user interface, the system comprising:
- a device with a touch user interface for controlling a load, the device comprising:
  - an array of individually controllable LED light sources;
  - data lines for interconnecting successive LED light sources to obtain a daisy-chain of the successive LED light sources in said array and for rippling control data through the daisy-chain to a particular LED light source in said array, wherein the particular LED light source in said array is arranged for removing one or more bits from the control data and for providing resulting control data downstream in the daisy-chain;
  - a feedback line for feeding back the resulting control data;
  - a touchpad for connecting, when in use touched, one of the data lines and the feedback line;
  - a controller having (i) an output for sending the control data over said data lines to the particular LED light source, and (ii) an input for receiving the resulting control data over the feedback line when the touchpad is touched; the controller being configured to (i) comparing said sent control data with said received resulting control data for associating the touchpad, when in use touched, with a position in the array of individually controllable LED light sources of the particular LED light source, and (ii) providing a control signal for controlling the load based on said position; and
- a load having an electronic device.

* * * * *